Aug. 16, 1949.   A. W. KOON   2,478,970
APPARATUS OF THE FLUID CURRENT TYPE
FOR DESICCATING FOODSTUFFS
Filed Oct. 15, 1945
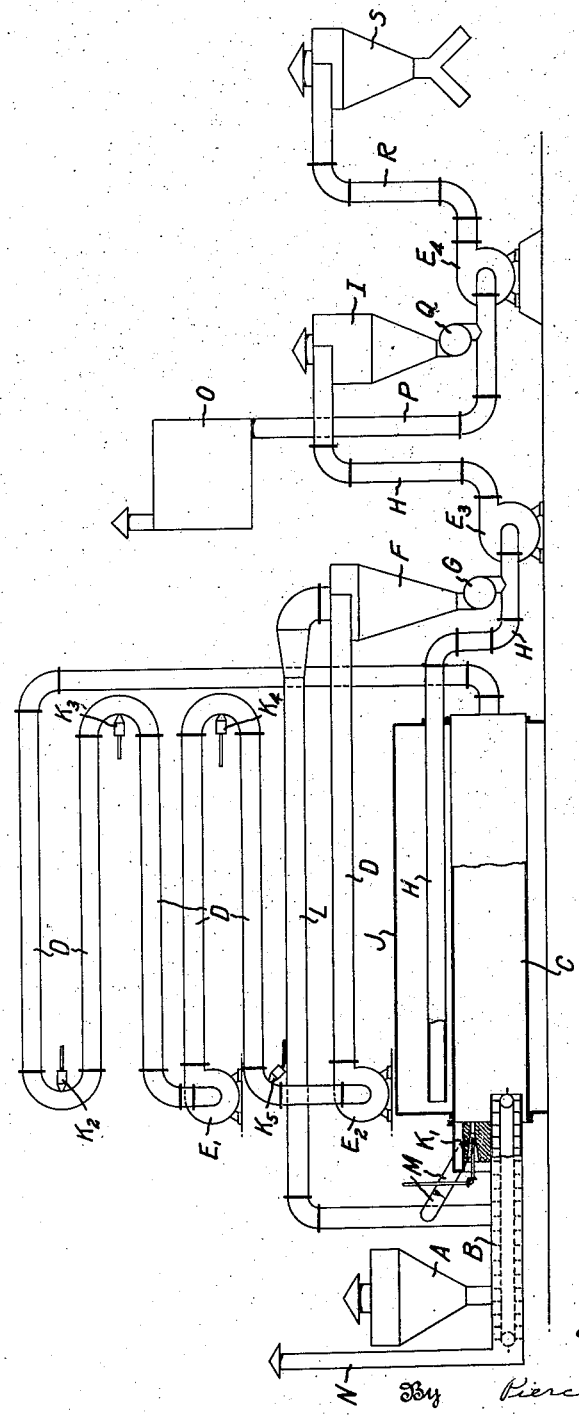
Inventor:
Arthur W. Koon,
By Pierce & Scheffler
his Attorneys.

Patented Aug. 16, 1949

2,478,970

UNITED STATES PATENT OFFICE 2,478,970

APPARATUS OF THE FLUID CURRENT TYPE FOR DESICCATING FOODSTUFFS

Arthur W. Koon, Luling, La.

Application October 15, 1945, Serial No. 622,362

4 Claims. (Cl. 263—19)

The present invention relates to the art of desiccating moisture-containing solids and semisolids which are of such a particle size as to be susceptible of being carried in a gas stream, and is particularly concerned with improvements in a process of, and more especially with an improved apparatus for treating, i. e., "curing," freshly-cut immature forage crops and fodder, dehydrating freshly gathered leafy vegetable matter, drying matured seed and root crops, and desiccating other moisture-containing foodstuffs and the like; which process and apparatus were described in U. S. Patent No. 1,759,702, issued May 20, 1930, to Arthur W. Koon.

Generically considered, the process comprises introducing a stream of particles of the moisture-containing material to be desiccated into a high-velocity current of gaseous drying medium comprising or consisting essentially of a properly proportioned mixture of steam and inert gaseous combustion products which medium is maintained at an elevated temperature materially above the dew point thereof, maintaining free suspension of the material in the gaseous mixture during the travel of the latter for a relatively brief period of time, and separating the material from the gaseous mixture out of contact with atmospheric air and while the gaseous mixture is at a temperature materially above its dew point. For effecting this general process with best results, I have found it advisable to supplement the same by the following procedural features:

(1) Before the particles of moisture-containing material are suspended in the high-temperature gaseous mixture, the stream of particles is substantially purged of associated atmospheric air by scrubbing the same with a current of the aforesaid gaseous mixture at an intermediate elevated temperature, to the end that oxidation, scorching or burning of the material while undergoing the ensuing high-temperature drying treatment, involving the application of heat at or above the kindling temperature of the material, is minimized or avoided.

(2) After the aforesaid removal of atmospheric air, and before the material is suspended in the high-velocity current of high-temperature gaseous mixture, the material to be desiccated preferably is pre-heated by intimate contact with a current of the same gaseous mixture at a temperature materially above its dew point but preferably lower than that at which the current of gaseous mixture is maintained during at least a part of the period in which the particles of material are suspended therein. By recourse to this pre-heating step dehydration of the material is initiated and carried to such a degree that the particles of material are rendered readily suspendable in the gaseous current, and that the satisfactorily "complete" desiccation of the material can be effected in a single cycle or pass of high-temperature desiccation treatment.

(3) During the travel of the high-temperature gaseous current carrying particles of the material freely suspended therein the desired high velocity is maintained by the use of a plurality of centrifugal blowers operating in series.

(4) Also, during said travel high-temperature heat is imparted to the gaseous current in a plurality of stages, whereby to maintain the current at the desired high temperature or temperatures. Such stage-wise heating preferably, although not necessarily, is effected by introducing high-temperature, inert, gaseous combustion products directly into said current at spaced intervals along its course.

(5) After the dehydrated material has been separated, at a high temperature, from the current of gaseous drying medium it still is associated with some of the steam-containing mixture, and would re-absorb moisture from the latter were it to be cooled to below the dew point in contact therewith. To avoid this, and simultaneously to reduce the temperature of the dehydrated material, I substantially replace the moisture-laden gas with a gas of a desirably low humidity by re-suspending the separated material in a current of such low-humidity gas, at an elevated temperature materially lower than that of the aforesaid mixture, and then separating the so-treated material from the current of suspending gas. This suspending gas may be a current of hot or warm partially or completely dehumidified air. The dehydrated material thereafter may be and preferably is further cooled before being stored or distributed.

The apparatus for use in effecting the improved process of the present invention essentially consists in an assemblage of members cooperating to constitute an essentially closed circuit for circulating a current of high-temperature inert gaseous drying medium comprising steam and gaseous combustion products, together with other associated devices. This "closed circuit assemblage" includes means for advancing a stream of the material to be desiccated, means for purging air from the advancing material, a material-suspending means, a separator for removing solid particles suspended in a carrying gas, a circuitous conduit connecting the material-suspending means with the separator, one or more blowers interposed in the circuitous conduit, a return conduit for leading gas (freed from suspended particles) from the separator to the material-advancing means, a fluid fuel burner associated with the material-suspending means and adapted to discharge thereinto high-temperature inert gaseous combustion products, and a plurality of high-temperature heating means associated with the circuitous conduit which latter heating means may be and preferably are fluid fuel burners discharging their high-temperature inert gaseous combustion products directly into the gas current being maintained in said circuitous conduit. For maintaining a desirable balance in this system, there is provided a venting means for exhausting excess gaseous drying medium. Such venting means may be and preferably is a part of the aforesaid air-purging means. In association with the "closed system assemblage" above described there are the following pieces of equipment: a second separator, a source of hot or warm relatively dry gas (e. g., dry air), a third conduit communicating between the dry gas source and the second separator, a blower for maintaining a current in said third conduit, and means for feeding into this latter current a stream of solid particles from the first named separator; also, there preferably is provided a feeding means for feeding a stream of material to be desiccated into functional proximity to the material-advancing means. Lastly, there may be and preferably are provided a third separator, a fourth conduit, a source of relatively cool and dry gas (e. g., of dehumidified ambient air), a blower for maintaining a current of cool dry gas through said fourth conduit from said source to the third separator, and means for feeding solid material from the second separator into the current maintained in said fourth conduit.

The improved process, and improved apparatus for use in effecting it, will now be more specifically described, with reference to the accompanying drawing, in which the single figure is a schematic view of a system of apparatus adapted for use in carrying out the process of the invention.

According thereto, a vented hopper A is mounted above and adjacent one end of, and communicating with, an elongated rectilinear enclosure B housing an endless conveyor actuated by conventional means (not shown). The opposite end of enclosure B communicates with the inlet end of a rotary drum C having generally closed ends. Conventional means (not shown) are provided for suspending and rotating drum C. Between the inlet from A and drum C there is provided in enclosure B an opening for the introduction into B of a current of gas as from conduit L. N is an exhaust conduit for discharging gas to atmosphere from that end of enclosure B which is remote from drum C.

D is a circuitous conduit communicating between drum C and a cyclone separator F. E—1 and E—2 diagrammatically represent two motor-driven centrifugal blowers which are interposed in series at spaced intervals in conduit D and serve to create and impart a high velocity to a current of gas from C to F. Conduit L communicates between cyclone separator F and conveyor enclosure B.

K—1 diagrammatically represents a fluid fuel burner or assemblage of a plurality of such burners discharging high-temperature inert gaseous combustion products into the gaseous drying medium adjacent the inlet end of drum C, whereby to raise the temperature of the medium to the desired level, e. g., to say 1000° F. or above. K—2, K—3, K—4 and K—5 similarly represent a plurality of fluid fuel burners or firing tunnels discharging high-temperature, inert, gaseous combustion products into the current of gaseous drying medium circulated through conduit D. Branch conduits M from conduit L serve to divert gas from the latter through K—1 and into the inlet end of drum C.

It should be observed that so much of the apparatus as has now been described provides what is in effect a "closed system" in that a gaseous drying medium can be circulated from F through L to B to C and through D to F again. In operation: the material to be dried, in appropriate cases after having been reduced or cut into small pieces by means of an ensilage cutter or equivalent chopping device (not shown), is introduced into hopper A, and by the latter is fed to the conveyor in enclosure B. As the subdivided material is advanced towards drum C it is swept by a current of a hot (e. g., say 300° F.) mixture of steam and inert gaseous combustion products from conduit L: during the initial stage of the movement of the material through B, i. e., between the inlet from A and the inlet from L, its direction of travel is counter to that of excess gas mixture exhausting to atmosphere through conduit N, whereby atmospheric air is purged from the material; during the subsequent stage, the air-free material moves co-currently with the gas mixture passing from L into drum C. An "excess" of gas mixture, over and above the demands of the blower units used to move the material through the system, is created by (a) expansion of the water (in the product) into steam and by (b) the continuous introduction of the high-temperature, inert, gaseous combustion products into the system.

As drum C revolves, the lighter and drier particles of material fed thereinto from B are suspended in the gas current passing therethrough. The heavier (e. g., wetter) particles, being exposed to the heated gas current, lose water to the latter by evaporation and likewise become suspended in said current and are carried into the flow line (in conduit D) which passes, and receives high-temperature inert gaseous combustion gases from, combustion chambers or firing tunnels K2, K3, K4 and K5. Sufficient heat, at a sufficiently elevated temperature level, is supplied directly to the current by these latter to drive off the moisture from within the particles during their relatively very brief course of travel in said flow line. By proper adjustment of the feed of fluid fuel and combustion air to the firing tunnels or combustion chambers (K—1—K5) substantially perfect combustion is realized, thereby obviating the introduction of unburnt fuel of free air into the flow line. The necessary high velocity is imparted to the current by the tandem blowers E1, E2. In separator F the dehydrated particles are separated from the current of gas mixture which had carried them through conduit D. The gas mixture effluent from separator F passes through conduit L and largely to the inlet end of drum C by way either (a) of enclosure B or (b) of branch conduits M and burner K1. A controlled amount of the gas mixture delivered by conduit L to enclosure B is exhausted through the latter to atmosphere by way of exhaust conduit N. Any further excess of gas mixture may be vented directly to the atmosphere through suitable dampered pipes (not shown), whereby to maintain a self-balancing system.

The aforesaid separation (as between dehydrated particles and drying medium current) does not serve to free the particles from entrained gas mixture. Moreover, the entrained gas mixture is laden with moisture which latter would condense on the particles were the latter to be cooled to below the dew point in contact with the gases. Accordingly, I provide means for separating the moisture-laden gases from the dehydrated material at elevated temperature, which means now will be described.

At the bottom of separator F there is provided a dumping gate G located above and discharging into a conduit H. This latter, in which a centrifugal blower E3 is interposed, communicates between a source of hot air and a high-efficiency collector I provided with a dumping gate Q. J diagrammatically represents a thermally insulated but not air-tight enclosure within which drum C is housed. The open end and end portion of circuit H on the suction side of blower E3 are located within enclosure J above drum C, and blower E3 draws hot air from within said enclosure by way of conduit H and creates a current of said hot air passing through conduit H and to collector I.

O represents a source of relatively cool air of controlled low humidity, E4 a blower, P a conduit communicating between O and the suction side of the blower, S a cyclone separator provided with a bagger for separated solids, and R a conduit communicating between E4 and S.

Particles discharged by dumping gate G from separator F into conduit H are suspended in the current of hot air from enclosure J and by the current are transported into collector I. In the course of the travel of the particles through conduit H, moisture laden gas very largely is "scrubbed" from the particles by the suspending air, to the end that the particles separated out of the current discharged into collector I are associated with a gas (air) of relatively low moisture content only, in which association the particles can, under suitable conditions of atmospheric humidity, be cooled to below the dew point without danger of condensing moisture thereon. Dehydrated particles are discharged from collector I through dumping gate Q into conduit P, are suspended in a current of cool, low-humidity air from source O, or directly from the atmosphere, and are carried in said current to separator S wherein they are collected for immediate use or for packaging (e. g., bagging) for shipment or storage.

Source O may be any suitable air dehumidifying device of known type. Its use may be and generally is restricted to those occasions when the ambient air is unduly humid: when the ambient air is desirably dry this latter may, without dehumidification, provide the gas current in conduits P and R.

It is to be appreciated that in the carrying out of the above described process the material to be desiccated is subjected to the highest temperature condition only after having been purged of initially associated atmospheric air and only at a time when said material is freely suspended in a relatively high-velocity current of the inert (i. e., non-oxidizing) gaseous drying medium, consisting essentially of steam and inert gaseous combustion products, in a substantially closed system. It is to be appreciated, also, that after the so-desiccated material has been separated from the bulk of the moisture-laden drying medium it is substantially freed from entrained moisture-laden gas while maintained at an elevated temperature at which moisture does not condense and thereafter is associated with a gas of relatively low humidity during at least the initial part of its cooling. These procedural features make possible a substantial simplification of the apparatus and process.

I claim:

1. A system of apparatus for use in desiccating moisture-containing foodstuffs, fodder, forage and like material, comprising, in combination, an essentially closed circuit for circulating a current of high-temperature inert gaseous drying medium, said circuit including: a material-advancing means, a material-suspending means cooperating therewith, a separator, a circuitous conduit connecting the material-suspending means with the separator, a current-inducing means interposed in said circuitous conduit, a plurality of fluid fuel burners arranged to introduce high-temperature inert gaseous combustion products into said circuitous conduit at spaced intervals therealong, a return conduit connecting the separator with the material-advancing means, a fluid fuel burner arranged to discharge high-temperature gaseous combustion products into said material-suspending means, and a branch conduit communicating between the return conduit and the last-mentioned burner, the several members above recited cooperating to constitute the aforesaid essentially closed circuit; means associated with the material-advancing means for venting excess gaseous drying medium from the circuit into the atmosphere in counter-current contact with material being advanced into the circuit, a second separator, a source of warm relatively dry gas, a third conduit communicating between said source and said second separator and provided with a blower for maintaining a current of warm relatively dry gas from said source to said second separator, and means for feeding material from the separator of the closed circuit into said third conduit.

2. A system of apparatus for use in desiccating moisture-containing foodstuffs, fodder, forage and like material, comprising, in combination, an essentially closed circuit for circulating a current of high-temperature inert gaseous drying medium, said circuit including: a material-advancing means, a rotary drum member cooperating therewith, a separator, a circuitous conduit connecting the rotary drum member with the separator, at least one blower interposed in said circuitous conduit and arranged to maintain a high-velocity current of gas from said rotary drum member through said circuitous conduit to said separator, a plurality of fluid fuel burners arranged to introduce high-temperature inert gaseous combustion products into said circuitous conduit at spaced intervals therealong, a return conduit connecting the separator with the material-advancing means, a fluid fuel burner arranged to discharge high-temperature gaseous combustion products into said rotary drum member, and a branch conduit communicating between the return conduit and the last mentioned burner, the several members above recited cooperating to constitute the aforesaid essentially closed circuit; means associated with the material-advancing means for venting excess gaseous drying medium from the circuit into the atmosphere in counter-current contact with material being advanced into the circuit, a second separator, a source of warm relatively dry gas, a third conduit communicating between said source and said second separator and provided with a blower for maintaining a current of warm relatively dry gas from said source to said second separator, and means for feeding material from the separator of the closed circuit into said third conduit.

3. A system of apparatus for use in desiccating moisture-containing foodstuffs, fodder, forage and like material, comprising, in combination, an essentially closed circuit for circulating a current of high-temperature inert gaseous drying medium, said circuit including: a material-advancing means, a material-suspending means cooperating therewith, a separator, a circuitous conduit connecting the material-suspending means with the separator, a current-inducing means interposed in said circuitous conduit, a plurality of fluid fuel burners arranged to introduce high-temperature inert gaseous combustion products into said circuitous conduit at spaced intervals therealong, a return-conduit connecting the separator with the material-advancing means, a fluid fuel burner arranged to discharge high-temperature gaseous combustion products into said material-suspending means, and a branch conduit communicating between the return conduit and the last mentioned burner, the several members above recited cooperating to constitute the aforesaid essentially closed circuit; means associated with the material-advancing means for venting excess gaseous drying medium from the circuit into the atmosphere in counter-current contact with material being advanced into the circuit, a second separator, a source of warm relatively dry gas, a third conduit communicating between said source and said second separator and provided with a blower for maintaining a current of warm relatively dry gas from said source to said second separator, means for feeding material from the separator of the closed circuit into said third conduit, a third separator, a source of relatively cool and dry gas, a fourth conduit communicating between said source and said separator and provided with a blower for maintaining therein a current of relatively cool and dry gas from said source to said third separator, and means for feeding material from said second separator into said fourth conduit.

4. A system of apparatus for use in desiccating moisture-containing foodstuffs, fodder, forage and like material, comprising, in combination, a rotary drum having generally closed inlet and outlet ends, an insulating housing about the rotary drum, an endless conveyor housed within an elongated rectilinear enclosure and adapted to forward a stream of the material to be desiccated to the inlet end of the rotary drum, gas-venting means in association with that end of the conveyor enclosure which is remote from the rotary drum, means for delivering a stream of the material to said conveyor at a point remote from the rotary drum, a cyclone separator provided with an inlet port, an outlet port for separated gas and a discharge port for separated solids, a circuitous conduit communicating between the outlet end of the rotary drum and the inlet port of the separator, at least one blower interposed in the circuitous conduit for maintaining a current of gas from the rotary drum to the inlet port of the separator, a plurality of high-temperature heating means at spaced intervals along the circuitous conduit, a second conduit communicating between the gas outlet port of the separator and the conveyor enclosure at a locus on the latter intermediate the material delivering means and the rotary drum, a fluid fuel burner in communication with the inlet end of the rotary drum, at least one branch conduit communicating between said second conduit and said fluid fuel burner, a second separator provided with an inlet port, a vent for separated gas and a discharge port for separated solids, a third conduit communicating between the housing of the rotary drum and the inlet port of the second separator, a blower interposed in said third conduit for maintaining a current of gas from said drum housing to said second separator, and means for delivering a stream of solids from the solids discharge port of said first separator into said third conduit at a locus intermediate said drum housing and said blower.

ARTHUR W. KOON.

REFERENCES CITED

The following references are of record in the file of this patent:

UNITED STATES PATENTS

| Number | Name | Date |
|---|---|---|
| 1,408,457 | Harrison | Mar. 7, 1922 |
| 1,524,617 | Goubert | Jan. 27, 1925 |
| 1,705,617 | Honigmann et al. | Mar. 19, 1929 |
| 1,733,022 | Koon | Oct. 22, 1929 |
| 1,759,702 | Koon | May 20, 1930 |
| 2,117,822 | Pehrson et al. | May 17, 1938 |
| 2,236,006 | Mulvany | Mar. 25, 1941 |
| 2,363,037 | Arnold | Nov. 21, 1944 |